United States Patent [19]

McDonough et al.

[11] Patent Number: 5,516,216
[45] Date of Patent: May 14, 1996

[54] PRINT ENHANCEMENT SYSTEM FOR ENHANCING DOT PRINTER IMAGES

[75] Inventors: Timothy M. McDonough; Aneesa R. Scandalis, both of Escondido; J. Erik Blume, Vista, all of Calif.

[73] Assignee: Hewlett-Packard Company, Palo Alto, Calif.

[21] Appl. No.: 339,306

[22] Filed: Nov. 14, 1994

Related U.S. Application Data

[63] Continuation of Ser. No. 56,037, Apr. 30, 1993, abandoned.

[51] Int. Cl.$^6$ .................................................. B41J 2/22
[52] U.S. Cl. ..................................... 400/124.01; 395/108
[58] Field of Search .................................. 358/296, 298; 400/124.01; 395/108

[56] References Cited

U.S. PATENT DOCUMENTS

| | | | |
|---|---|---|---|
| 4,193,092 | 3/1980 | Stoffel | 358/136 |
| 4,280,144 | 7/1981 | Bacon | 358/280 |
| 4,389,677 | 6/1983 | Rushby et al. | 358/280 |
| 4,437,122 | 3/1984 | Walsh | 358/166 |
| 4,847,641 | 7/1989 | Tung | 346/154 |
| 4,967,203 | 10/1990 | Doan et al. | 346/1.1 |
| 4,975,785 | 12/1990 | Kantor | 358/463 |
| 5,001,767 | 3/1991 | Yoneda et al. | 358/50 |
| 5,005,139 | 4/1991 | Tung | 364/519 |
| 5,016,118 | 5/1991 | Nannichi | 358/462 |
| 5,025,325 | 6/1991 | Hudson | 358/447 |
| 5,029,108 | 7/1991 | Lung | 364/519 |
| 5,062,724 | 11/1991 | Iizuka | 400/121 |
| 5,117,294 | 5/1992 | Yano | 358/447 |
| 5,149,212 | 9/1992 | Murakami | 400/121 |
| 5,205,660 | 4/1993 | Momose | 345/144 |
| 5,207,517 | 5/1993 | Ito | 400/121 |
| 5,237,624 | 8/1993 | Okamoto et al. | 382/22 |
| 5,258,854 | 11/1993 | Eschbach | 358/445 |
| 5,267,332 | 11/1993 | Walch et al. | 382/55 |
| 5,270,728 | 12/1993 | Lund | 400/121 |
| 5,329,380 | 7/1994 | Ishida | 358/455 |

FOREIGN PATENT DOCUMENTS

| | | | |
|---|---|---|---|
| 0356224A3 | 2/1990 | European Pat. Off. | 400/61 |
| 0506379A2 | 9/1992 | European Pat. Off. | 400/61 |

OTHER PUBLICATIONS

IBM Technical Disclosure Bulletin vol. 25 No. 10 Mar. 1983.

*Primary Examiner*—Christopher A. Bennett
*Assistant Examiner*—Steven S. Kelley

[57] ABSTRACT

A method and apparatus for enhancing the quality of images printed by dot printers or dot displays are disclosed. Image irregularities caused by quantization are smoothed by using a set of rules to transform an initial pattern into an enhanced pattern for printing. The initial pattern may consist of a matrix of bits representing an image having X dots per inch along an intended direction of printing. An intermediate pattern is formed by replicating columns of bits from the initial pattern. Image enhancement rules are applied to the intermediate pattern to invert one or more bits in the intermediate pattern to create an enhanced pattern. The enhanced pattern is printed at n*X dots per inch along the direction of printing where n≧1.

19 Claims, 8 Drawing Sheets

PATTERN  ACTION

PATTERN    ACTION

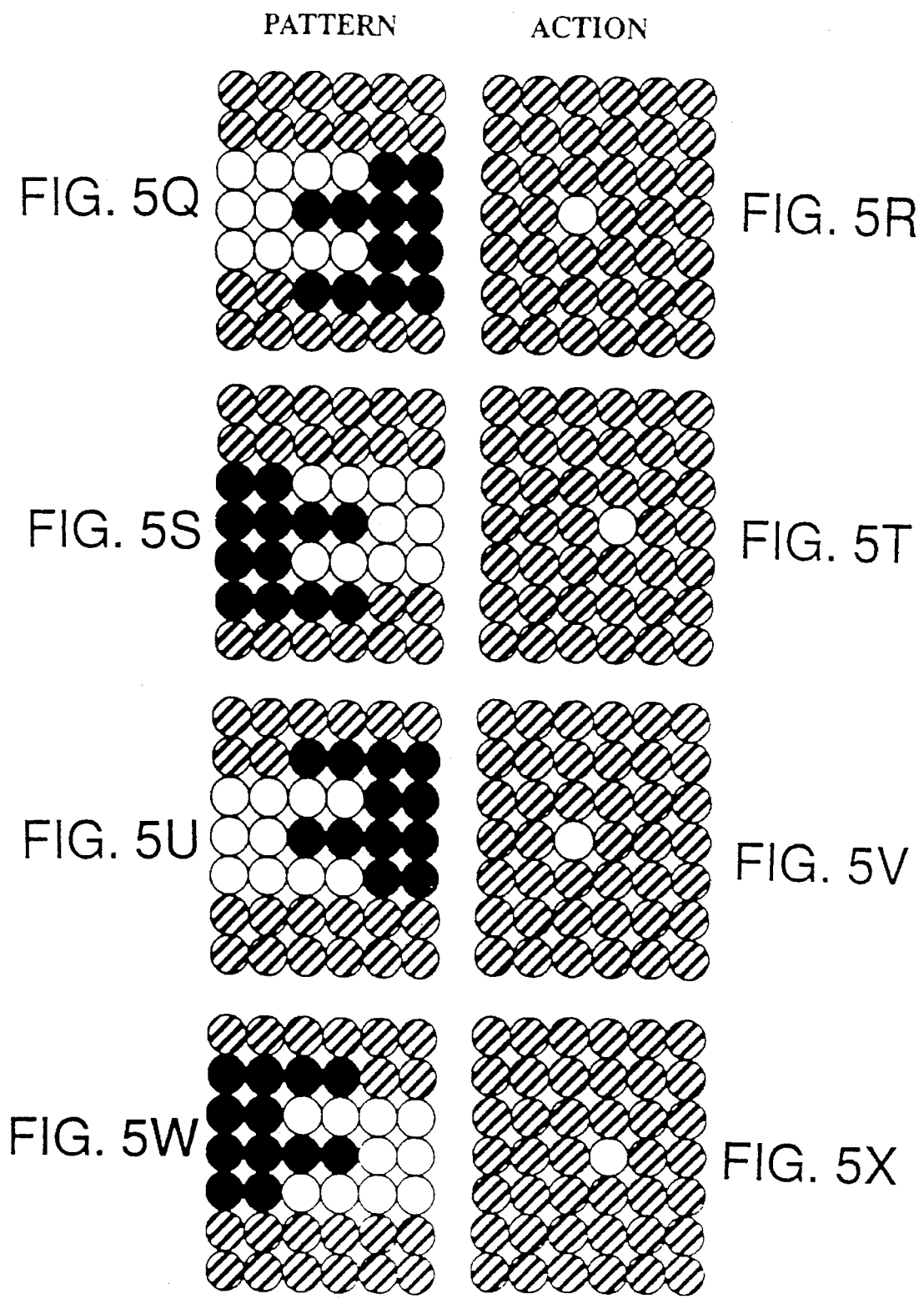

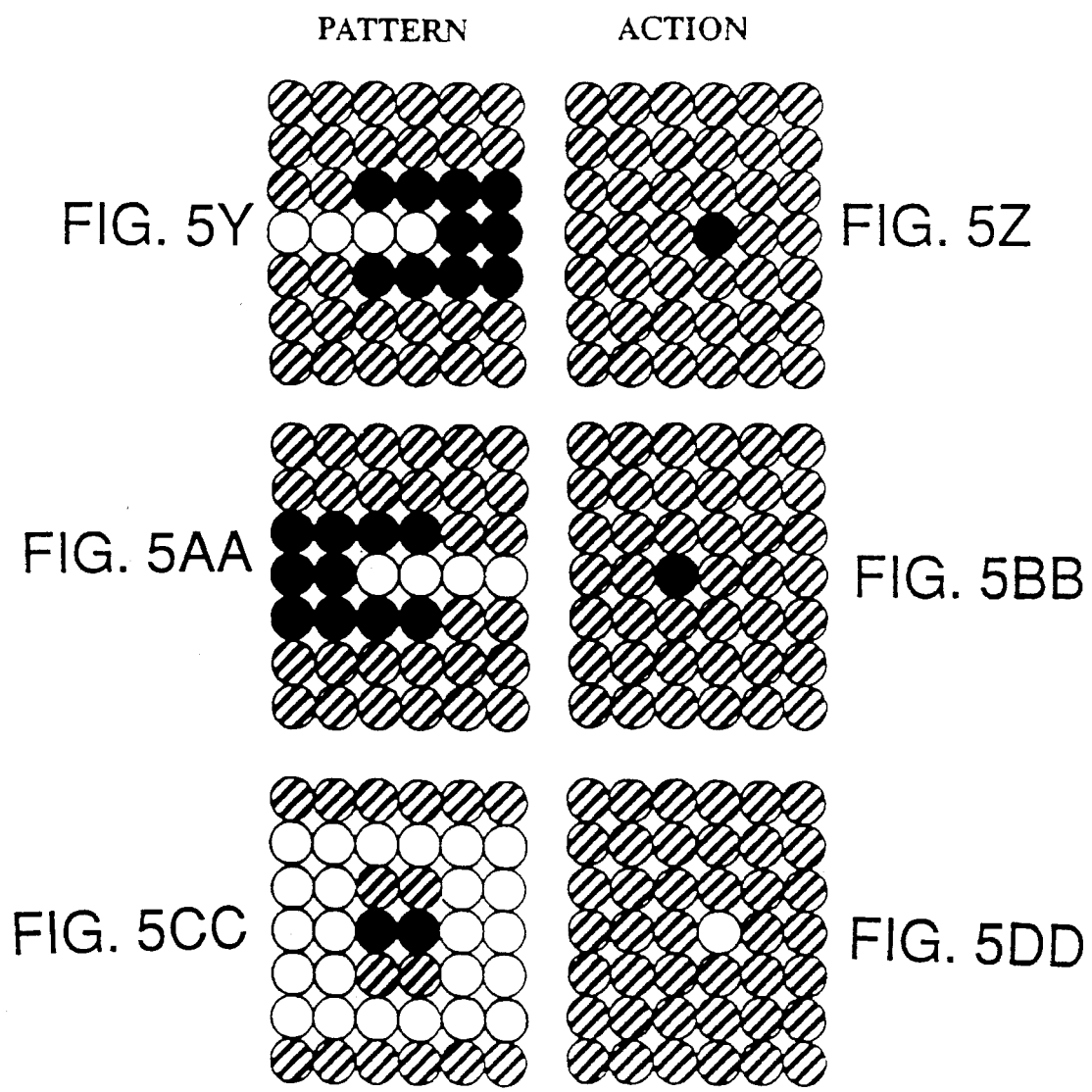

PRINT ENHANCEMENT SYSTEM FOR ENHANCING DOT PRINTER IMAGES

This is a continuation of application Ser. No. 08/056,037 filed on Apr. 30, 1993, now abandoned.

FIELD OF THE INVENTION

This invention relates to dot printers or other types of dot display systems, and more particularly, to a method and apparatus to enhance the quality of images printed by dot printers or otherwise displayed by dot display systems.

BACKGROUND OF THE INVENTION

Dot printers produce a printed image by depositing a pattern of individual dots of ink upon a recording medium, such as a sheet of paper. Ideally, if the individual dots are sufficiently small and closely spaced, only the overall image, and not the individual dots, are perceived by the human eye.

However, depending on the relative size of the smallest detail of the overall image and the size of the individual dots, certain irregularities may be perceived due to the discrete nature of the dots and due to the inherent nature of the printing process. For example, undesirable stepping (quantization) and jagged edges are generally apparent when the image consists of a diagonal line at a slight angle to the print direction, or a diagonal line at a steep angle to the print direction. Jagged edges are also noticeable in images with curved lines.

Thus, what is needed is a print image enhancement system for providing a more pleasing dot image. This print enhancement system should meet three important criteria. Firstly, the appearance of the final image must be improved in most cases with only minimal degradation in the remainder of cases. Secondly, the print image enhancement system must have a minimal impact on printer throughput. Thirdly, the print image enhancement system must be low cost and compatible with existing systems.

SUMMARY OF THE INVENTION

A print image enhancement system according to this invention enhances the quality of images printed by dot printers or otherwise displayed by dot display systems. In the preferred embodiment, the print image enhancement system resides in a dot printer. The print image enhancement system effectively smoothes out noticeable quantization in the dot pattern by using a set of rules to transform an initial dot (or bit) pattern into an enhanced pattern. The printed image is generated by printing the enhanced pattern.

The initial (pre-corrected) pattern input to the print image enhancement system may consist of a matrix of A rows and B columns of bits representing an initial image of A by B dots for printing at X dots per inch along the intended direction of printing. The preferred print image enhancement system uses a method that includes the following steps: (i) transforming the initial pattern of A by B bits contained in a memory into an intermediate pattern of A by C bits, wherein C>B, by duplicating the B columns of bits of the initial pattern; (ii) applying at least one rule from a set of rules to modify the intermediate pattern to create an enhanced pattern; and (iii) printing the enhanced pattern at n*X dots per inch along the direction of printing where n>1.

Each of the rules is represented by a rule-pattern and a rule-action such that the rule application step includes the steps of: (i) comparing the intermediate pattern with a rule-pattern to find a match; and (ii) if a match is found, inverting at least one bit of the intermediate pattern, as dictated by the corresponding rule-action, to form the enhanced pattern.

DESCRIPTION OF THE PREFERRED EMBODIMENT

A print image enhancement system according to this invention resides in a dot printer and interfaces with a conventional, bit-mapped memory containing an initial dot or bit pattern. This initial pattern corresponds to a conventional dot pattern which is printed by conventional dot printers. A flowchart of the method used by the print image enhancement system to improve the print quality of this initial pattern is shown in FIG. 1.

Figure 1:
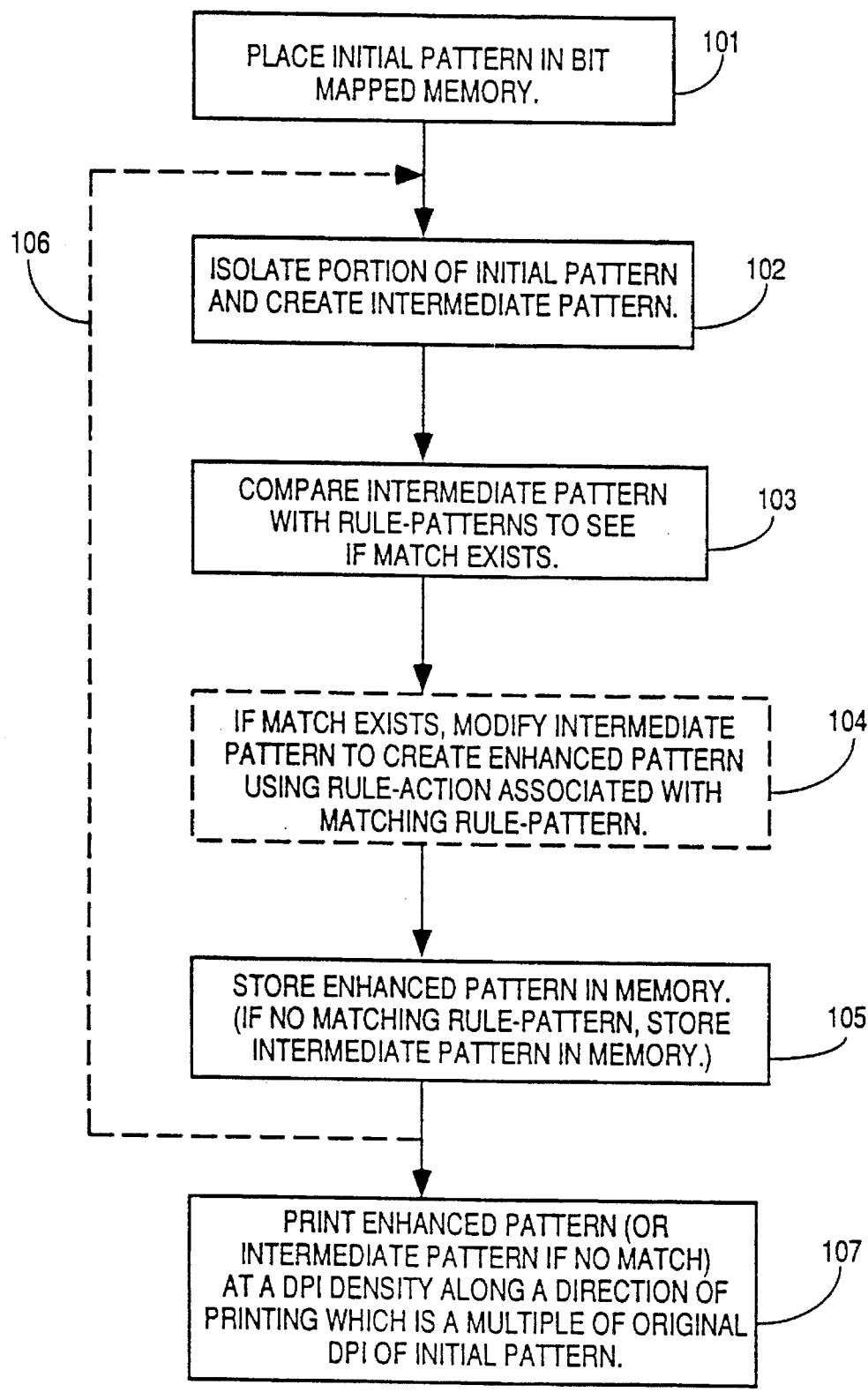
FIG. 1 shows an illustrative diagram of the preferred method used by the print image enhancement system.
Figure 2A:
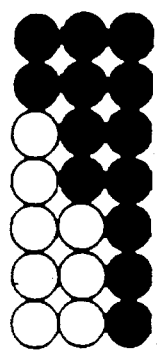
FIG. 2A shows an illustrative diagram of an initial pattern, for printing at X dots per inch along an intended direction of printing, before any processing by the print image enhancement system.

In the flowchart, it is assumed that the initial pre-corrected pattern is already stored in a conventional bit mapped memory, using prior art techniques, as illustrated by step 101 of FIG. 1. In the preferred embodiment, a 7 row by 3 column matrix portion (correction window) of the initial pattern in the memory is effectively isolated from the initial pattern for enhancement. One example of this 7 by 3 correction window is represented by FIG. 2A as if printed by a dot printer at X by X dots per square inch. It will be assumed for this example that the intended printer scans a printhead along a horizontal axis across a sheet of paper.

The black dots in FIG. 2A represent 1's in the initial bit pattern corresponding to ink-dots that would be printed by a prior art dot printer without the print enhancement system. The white dots represent 0's in the initial pattern corresponding to where no ink-dots would be printed. Although this embodiment uses white and black dots to represent 0's and 1's in the bit mapped memory, this notation may be reversed. Also, although this embodiment operates on a 7 by 3 array correction window, this invention may be practiced on any size correction window.

Figure 2B:
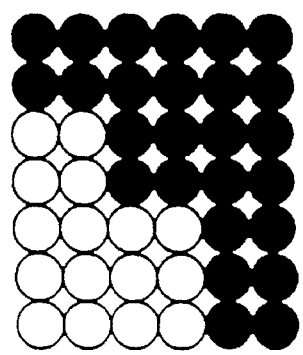
FIG. 2B illustrates the intermediate pattern that results from duplicating columns of dots in the initial pattern of FIG. 2A.

As illustrated by step 102 in FIG. 1, after the print image enhancement system isolates the 7 by 3 correction window portion of the initial pattern, the enhancement system forms an intermediate pattern. The intermediate pattern in this particular example is illustrated by FIG. 2B. The intermediate pattern of FIG. 2B is obtained by duplicating each column of dots of FIG. 2A and results in a 7 by 6 array of dots or bits. Step 102 of this invention is not restricted to only duplication of a portion of the initial pattern. For example, step 102 may include triplicating each column of dots of a correction window of the initial pattern, thus resulting in a 7 by 9 array.

Figure 2C:
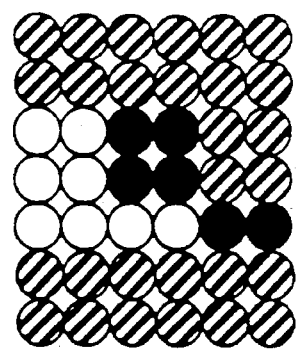
FIG. 2C illustrates the particular rule-pattern which matches the intermediate pattern of FIG. 2B.

As illustrated by step 103 in FIG. 1, after forming the 7 by 6 array intermediate pattern, the print image enhancement system compares the intermediate pattern with a number of rule-patterns to see if a match exists. These rule patterns may be hard-coded into an ASIC, such as the ASIC 304 shown in FIG. 3, or even stored in a conventional memory. An applicable rule-pattern for this example is illustrated by FIG. 2C. The black dots of FIG. 2C represent bit values in the intermediate pattern which must be 1 in order to match with the rule-pattern. The white dots of FIG. 2C represent bit values in the intermediate pattern which must be 0 in order to match with the rule-pattern. The hatched dots in FIG. 2C represent "don't care" values which indicate that the corresponding bits in the intermediate pattern could be either 1 or 0 and still result in a match with the rule-pattern.

Each of the rule-patterns is associated with a rule-action, such that if an intermediate pattern matches a rule-pattern, then the action dictated by the corresponding rule-action is performed on the intermediate pattern. The rule-action corresponding to the rule-pattern of FIG. 2C is illustrated by FIG. 2D.

Figure 2D:
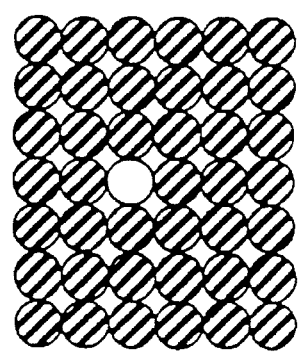
FIG. 2D illustrates the rule-action to be applied to the intermediate pattern of FIG. 2B.
Figures 5A, 5B, 5C, 5D, 5E, 5F, 5G, 5H:
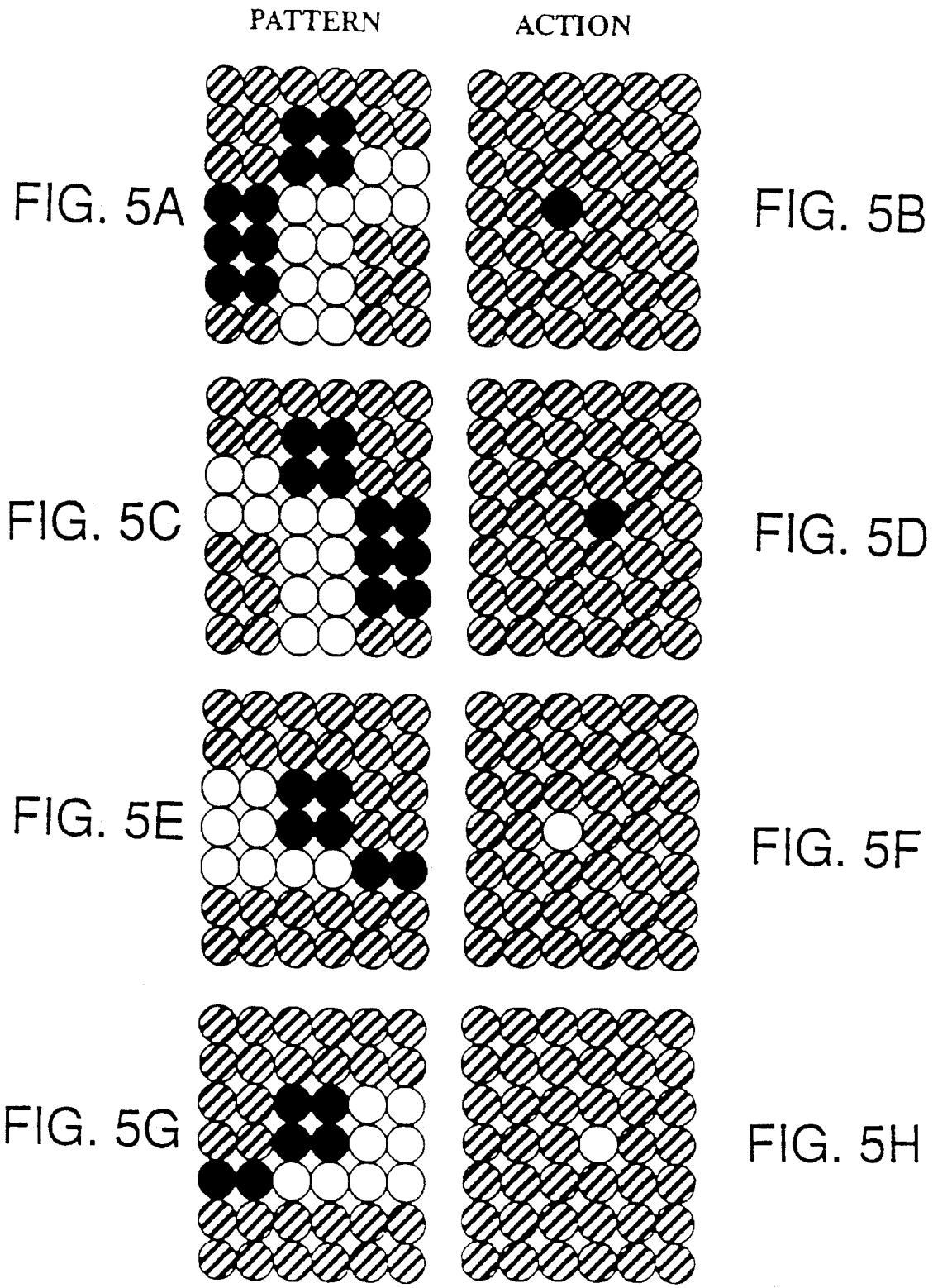
FIGS. 5A through 5DD illustrate examples of rule-patterns with their corresponding rule-actions to be taken in the event of a match between an intermediate pattern and a rule-pattern.
Figures 5I, 5J, 5K, 5L, 5M, 5N, 5O, 5P:
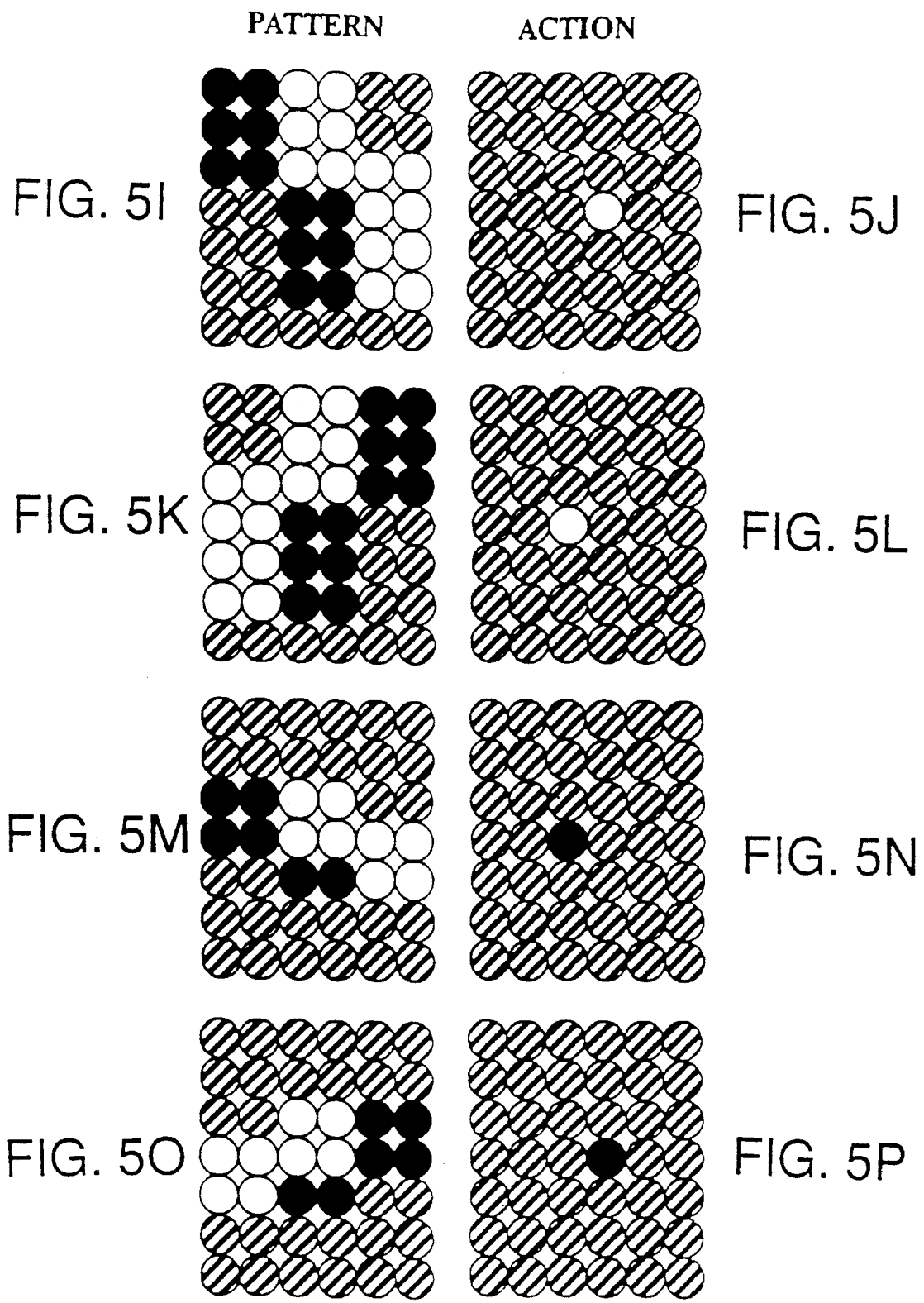

The hatched dots in the rule-action illustrated by FIG. 2D indicate that no action is to be taken on those bits. The white dot of FIG. 2D indicates that the corresponding bit of the intermediate pattern of FIG. 2B must be changed from 1 to 0 to create the enhanced pattern. Conversely, a black dot in the rule-action (e.g., FIG. 5B) would indicate that the corresponding bit of the intermediate pattern must be changed from 0 to 1 to create the enhanced pattern.

Figure 2E:
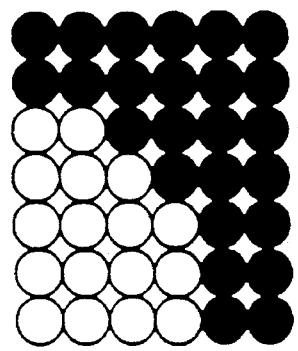
FIG. 2E illustrates the enhanced pattern that results from application of the rule-action of FIG. 2D to the intermediate pattern of FIG. 2B.

As illustrated by step 104 in FIG. 1, if there is a match in step 103, then the intermediate pattern is modified to form an enhanced pattern by performing the action dictated by the corresponding rule-action. Step 104 is shown enclosed with a broken line boundary to indicate that if there is no match in step 103, no modification is made to the intermediate pattern. In the example of the intermediate pattern of FIG. 2B matching the rule-pattern of FIG. 2C, the action indicated by the rule-action of FIG. 2D is applied to the intermediate pattern to create the enhanced pattern illustrated by FIG. 2E.

Steps 102, 103, and 104 may be performed on multiple correction windows of the initial pattern at the same time, such that large sections of the initial pattern in memory may be enhanced in parallel.

Once processing is completed for all or a selected portion of the initial pattern, the enhanced pattern is stored as shown in step 105.

Steps 102, 103, 104, and 105 may be repeated as often as necessary via control return step 106 of FIG. 1 so as to process all or a desired amount of the initial pattern received in step 101.

Figure 2F:
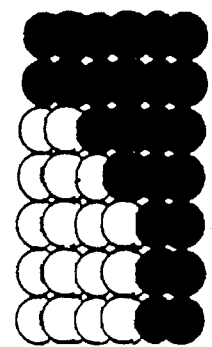
FIG. 2F illustrates the enhanced final image, printed at 2X dots per inch along the direction of printing, that corresponds to the enhanced pattern of FIG. 2E.

As shown in step 107 of FIG. 1, the enhanced pattern is printed at a dots per inch (dpi) density along the direction of printing (e.g., along the horizontal axis for a scanning inkjet printer) which is a multiple of the original dots per inch density along the intended direction of printing of the initial pattern and, consequently, at a dot spacing along the direction of printing which is a fraction of the dot spacing of the initial pattern. FIG. 2F illustrates the final printed image that corresponds to the portion of the initial image of FIG. 2A. In an illustrative example, if the initial image of FIG. 2A were to be printed at 300 dpi along the direction of printing (e.g., along the horizontal axis), the final image is printed at 600 dpi along the direction of printing at half-dot spacing, since the initial pattern was duplicated to obtain the intermediate pattern (FIG. 2B).

In the above example, only the dpi along a horizontal direction of printing is increased, and the dpi along the vertical direction is unchanged by the print enhancement process. This will be the case where an inkjet printer is used which incorporates a scanning printhead having vertical, linear arrays of ink-ejection nozzles which are scanned in a horizontal direction across a sheet of paper. The dpi in the horizontal direction is a function of the frequency of the ink-ejection signals supplied to the printhead. Since the printed dot density in the vertical direction is solely a function of the nozzle arrangement, the dpi density in the vertical direction is fixed. In other types of printers where the dpi may be variable in either or both of the vertical and horizontal directions, enhancement of the image using the disclosed inventive techniques may take advantage of increasing the dpi in either the vertical or horizontal directions or both.

Although the above description is based on duplication of the initial pattern in step 102, this invention is not restricted to the embodiment shown in FIG. 1 and described above. For example, if the initial pattern were triplicated in step 102, the final image would be correspondingly printed at three times the initial dots per inch density along the direction of printing at one-third dot spacing.

Figure 3:
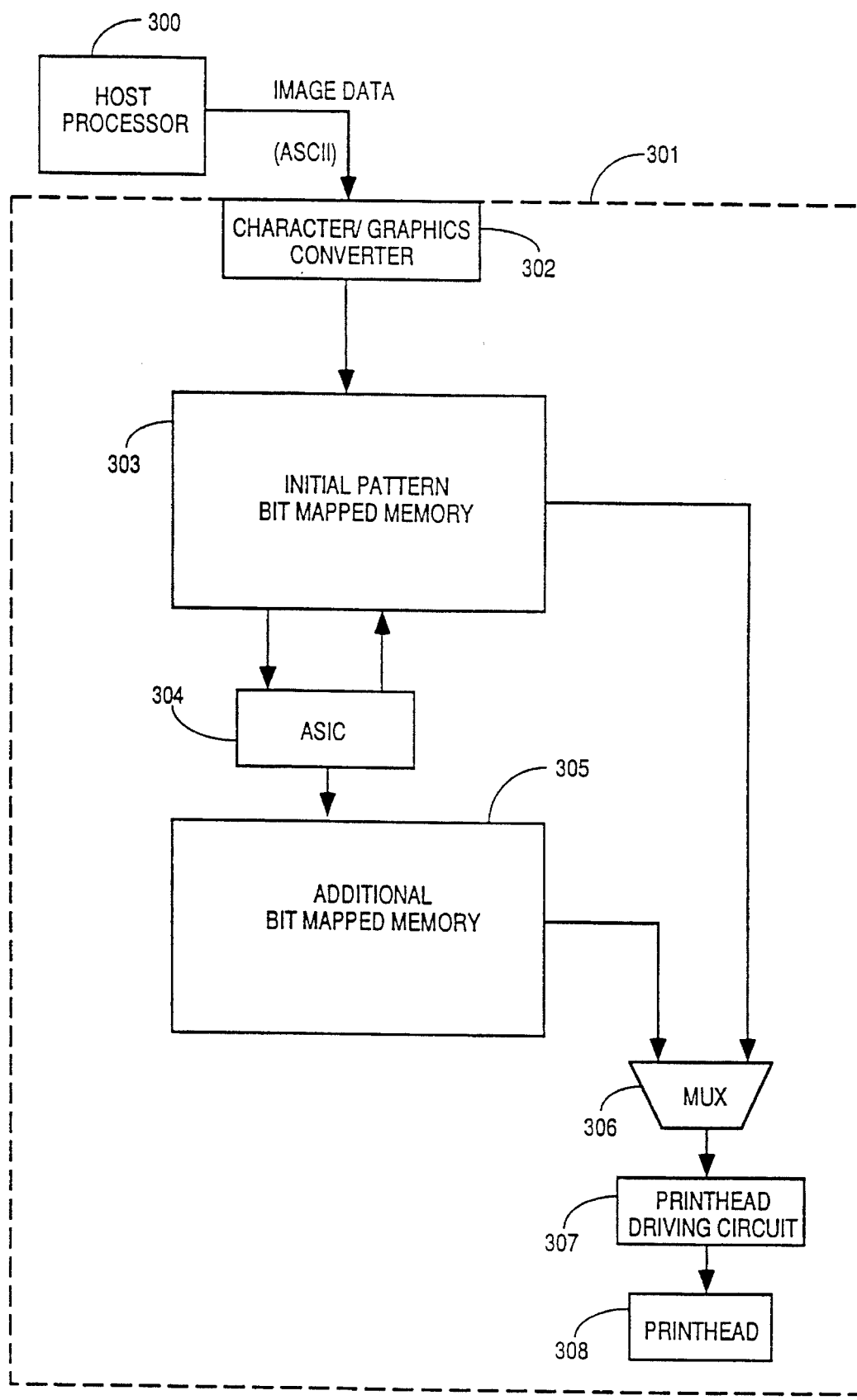
FIG. 3 illustrates one embodiment of the print image enhancement system according to this invention.

FIG. 3 illustrates in block diagram form the preferred embodiment print image enhancement system of this invention. A host processor 300, such as a conventional personal computer, outputs image data in ASCII form or in some other format. If necessary, a character/graphics converter 302 inside dot printer 301 converts the image data from host processor 300 into an initial pattern of bits. The initial pattern of bits is then stored in bit mapped memory 303.

The print image enhancement system is implemented in this embodiment by ASIC 304. A Hewlett-Packard ASIC model 1TY8-0001 is used in one embodiment. ASIC 304 is hard-wired with a particular set of rule-patterns and rule-actions and performs the steps 102–105 in FIG. 1 to smooth out certain quantization irregularities in the initial pattern. For each column of bits processed for enhancement by ASIC 304, two columns are generated, which will be referred to as an even column and an odd column. ASIC 304 then stores the even columns bits generated by ASIC 304 back in memory 303 and the odd column bits generated by ASIC 304 in an additional bit mapped memory 305. Multiplexer 306 combines the odd column and even column bits from memories 303 and 305 to effectively recreate the enhanced pattern for printing. The enhanced pattern is sent by printhead driving circuit 307 to printhead 308 for printing on the print medium.

Figure 4:
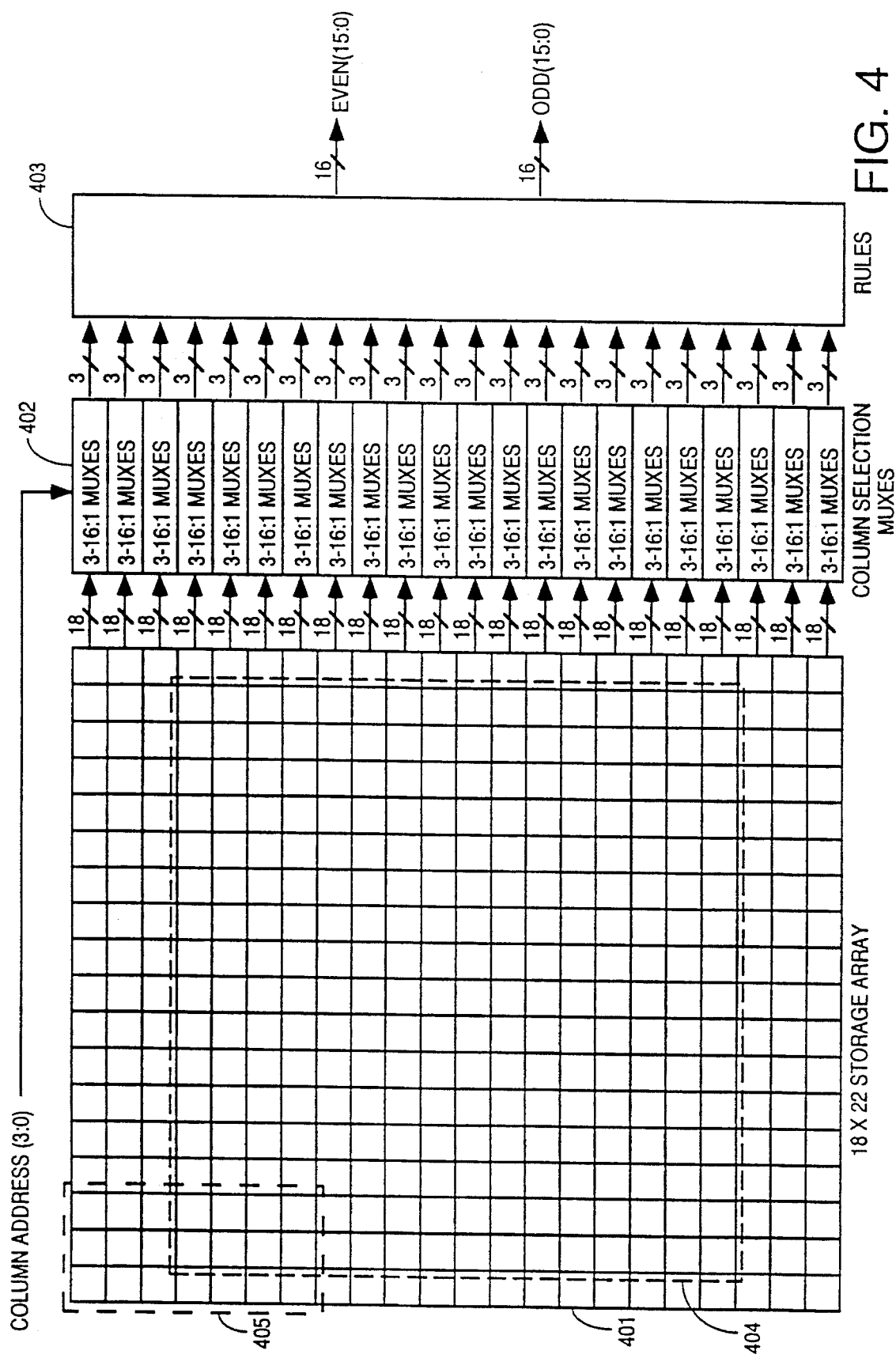
FIG. 4 illustrates the preferred internal implementation details of the ASIC of FIG. 3.

The print image enhancement system of one particular embodiment works incrementally on 16 by 16 array portions of the initial pattern stored in memory 303. FIG. 4 shows an 18 by 22 storage array 401 which initially contains the 16 by 16 array being worked on by ASIC 304. The 16 by 16 array is shown by a dotted line 404 inside the 18 by 22 array. The bit pattern contained in array 401 is loaded from the larger bit mapped memory 303, shown in FIG. 3, using conventional data transfer techniques.

The bits surrounding the 16 by 16 array 404 consist of one additional column of bits on either side of array 404 and three additional rows of bits on the top and bottom of array 404. The additional rows and columns in array 401 surrounding array 404 are necessary because the rules of the print image enhancement system are applied on the central bit of a 7 by 3 array correction window. For example, in order to have a 7 by 3 array correction window 405 surrounding the left corner bit of the 16 by 16 array 404, it is necessary to include the top three rows and the left most column of array 401. Although this embodiment works incrementally on a 16 by 16 array, this invention is not so limited. For example, storage array 401 may contain the whole of the initial pattern, half of the initial pattern, or some arbitrary portion of the initial pattern.

A four-bit column address is applied to multiplexers 402 to select a column of the 16 by 16 array for enhancement as well as the left and right adjacent columns. FIG. 4 shows three 16:1 column selection multiplexers associated with each row of array 401, for selecting three adjacent columns at a time. Therefore, for a given column address, multiplexer set 402 outputs an addressed column of 22 bits as well as the left and right adjacent columns.

FIG. 4 also shows rule application logic 403, which performs the method of steps 102–105 in FIG. 1 on each group of three columns of bits applied to logic 403. In the above method, rule application logic 403 applies the rule-patterns and appropriate rule-actions simultaneously to the central sixteen 7 by 3 bit groups outputted by multiplexers 402, as described with respect to FIGS. 1 and 2.

For each 16 bit column of array 404 processed by logic 403, two columns of 16 bits are generated, since logic 403 generates two bits for every bit in array 404 processed. That is to say, for every central bit in a 7 by 3 array correction window evaluated for printing enhancement, two bits are generated to provide the printing enhancement. Therefore, an additional memory 305 is need to store the added bits generated by logic 403. In one embodiment, the 16 bit columns outputted in parallel by logic 403 are alternately stored in bit mapped memory 303 of FIG. 3 and in the additional bit mapped memory 305 of FIG. 3. In another embodiment, all bits outputted by logic 403 may be stored in a single memory buffer.

Although in this embodiment, the original bits in the 18 by 22 array 401 remain unchanged while each column is processed, it is possible for either the odd column bits or the even column bits or some combination of these two to be written back into the 18 by 22 array 401 to implement a print image enhancement system using feedback.

The above process is repeated for each column of the 16 by 16 array 404 until all 16 columns have been processed. A new set of 18 by 22 bits from memory 303 is then loaded into array 401 from memory 303 for processing.

In another embodiment, array 401 is eliminated and bits are applied to multiplexers 402 directly from memory 303 in FIG. 3.

In the preferred embodiment, although an intermediate pattern (e.g., FIG. 2B) of 7 by 6 bits is described above as being compared to the various rule patterns, the sixth column in the 7 by 6 matrix is not required for comparison with the rule patterns since it is identical to the fifth column. Consequently, a 7 by 5 intermediate pattern is actually generated and processed by ASIC 304 to avoid unnecessary complexity. This also makes it easier to identify the central bit in the 7 by 5 array.

A multitude of rules may be used in conjunction with this invention. Examples of various rule-patterns and their associated rule-actions which may be used with this embodiment are shown in FIGS. 5A through 5DD. It is to be noted that more than one bit may be inverted in the intermediate pattern if the rule-action so dictates.

All hardware necessary to implement an embodiment of the print image enhancement system in accordance with the above description would be known to one of ordinary skill in the art.

In another embodiment of the invention, the function performed by ASIC 304 is performed by software programmed into a computer, or performed by a combination of hardware and software.

Although in the preferred method the dots per inch printing density along the printing direction is increased for the enhanced pattern, this may not a requirement for enhancement of the image in certain types of printing applications.

A print image enhancement system in accordance with the above invention has numerous advantages. Firstly, the appearance of the image is improved in most cases with minimal degradation for the remaining cases, depending on the rule-patterns and rule-actions used. Secondly, this system has minimal impact on printer throughput. Thirdly, this system is low cost and compatible with existing systems. For example, the 18 by 22 storage array 401 of FIG. 4 could double up as a data rotator to rotate an 18 by 22 bit block of data by 90° before being enhanced as described above. Such a rotator is typically used to convert a bit pattern from one to be printed one dot at a time across a page, such as with a laser printer, to one to be printed by printing a vertical array of dots at a time as a printhead is scanning horizontally across a page, such as with an inkjet printer.

This invention may be practiced wholly in the host processor, wholly in the dot printer, or partly in the host processor and partly in the dot printer. This invention may be practiced with a correction window of virtually any size, depending on the rule-patterns and rule-actions the designer chooses to use. Moreover, this invention may be practiced on a variety of dot printers, such as laser jet printers and ink jet printers. One such inkjet printer comprises a printhead incorporating one or more arrays of nozzles through which ink droplets are selectively ejected. The printhead scans across a sheet of paper or other recording medium to print a pattern of dots. This invention may even be practiced on dot printing display devices such as a cathode ray tube display or a liquid crystal display.

The description of an embodiment of this invention is intended to be illustrative and not limiting. Numerous modifications to and variations of this embodiment will be apparent to those skilled in the art after reading this disclosure, all of which are intended to be included within the scope of this invention.

What is claimed is:

1. A method of using a dot printer to print or otherwise display a final image generated from an initial pattern of bits corresponding to an A by B matrix of bits, representing an initial image having X dots per inch along an intended direction of printing, said method comprising the steps of:

forming from said initial pattern an intermediate pattern of C by D bits wherein $C \geq A$ and $D \geq B$, and wherein C and D are each greater than or equal to two;

determining whether a bit pattern in a plurality of rows and columns in said intermediate pattern matches a rule-pattern, said rule-pattern being one of a plurality of rule-patterns;

applying at least one rule-action from a plurality of rule-actions, if said bit pattern matches a rule-pattern, one or more of said rule-actions modifying said intermediate pattern by inverting one or more first logic level bits representing dots in said intermediate pattern to create an enhanced pattern of bits, said enhanced pattern of bits corresponding to said final image, and one or more of said rule-actions modifying said intermediate pattern by inverting one or more second logic level bits representing an absence of dots in said intermediate pattern to create an enhanced pattern of bits, said enhanced pattern of bits corresponding to said final image; and printing said final image, corresponding to said enhanced pattern, at n*X dots per inch along said direction of printing where n≧1.

2. The method of claim 1 wherein n>1.

3. The method of claim 2 wherein said step of forming said intermediate pattern comprises duplicating one or more columns of bits in said A by B matrix of bits and wherein n=2.

4. The method of claim 2 wherein said A by B matrix of bits comprises A rows and B columns of bits located in a first memory, and wherein said intermediate pattern duplicates one or more of said columns, said enhanced pattern comprising two or more columns of bits, said method further comprising the steps of:

storing certain ones of said columns of said enhanced pattern in said first memory and storing certain other ones of said columns of said enhanced pattern in a second memory; and multiplexing bits stored in said first memory and said second memory to recreate said enhanced pattern for printing.

5. The method of claim 1 wherein said applying step comprises the steps of:

comparing said bit pattern with a rule-pattern; and on finding a match between said bit pattern and a rule-pattern, inverting at least one bit from said intermediate pattern, said bit being indicated by a rule-action paired with said rule-pattern.

6. The method of claim 5 wherein said rule-pattern comprises a matrix of bits.

7. The method of claim 1 wherein said A by B matrix of bits is a pattern of 7 bits by 3 bits.

8. The method of claim 1 wherein said step of printing said final image comprises scanning a printhead of an inkjet printer across a recording medium at a density of n*X dots per inch along said direction of printing.

9. The method of claim 1 wherein said step of printing said final image comprises forming said final image on a CRT at a density of n*X dots per inch along said direction of printing on a CRT screen.

10. The method of claim 1 wherein D>B.

11. An apparatus comprising:

an initial pattern memory means for storing an initial pattern of bits corresponding to an A by B matrix of bits, said A by B matrix of bits representing an initial image having X dots per inch along an intended direction of printing;

means for detecting said initial pattern and transforming said initial pattern into an intermediate pattern of C by D bits, wherein C≧A and D≧B, and wherein C and D are each greater than or equal to two;

means for determining whether a bit pattern in a plurality of rows and columns in said intermediate pattern matches a rule-pattern stored in a memory means along with other rule-patterns;

means for applying one of a plurality of rule-actions to said intermediate pattern to modify said intermediate pattern if said bit pattern matches a rule-pattern, one or more of said rule-actions modifying said intermediate pattern by inverting one or more first logic level bits representing dots in said intermediate pattern to create an enhanced pattern of bits, and one or more of said rule-actions modifying said intermediate pattern by inverting one or more second logic level bits representing an absence of dots in said intermediate pattern to create an enhanced pattern of bits; and means for storing said enhanced pattern of bits in a memory means, said enhanced pattern corresponding to a dot pattern to be printed at n*X dots per inch along said direction of printing where n≧1.

12. The apparatus of claim 11 further comprising a dot printing means for printing said dot pattern on a recording medium.

13. The method of claim 11 wherein said initial pattern is stored in a bit-mapped memory along with a plurality of other initial patterns of bits corresponding to an A by B matrix of bits.

14. The apparatus of claim 11 wherein said A by B matrix of bits is a 7 row by 3 column matrix of bits.

15. The apparatus of claim 11 wherein n>1.

16. The apparatus of claim 11 wherein said means for transforming said initial pattern into said intermediate pattern duplicates one or more columns of bits in said A by B matrix of bits, and wherein n=2.

17. The apparatus of claim 11 wherein said A by B matrix of bits comprises A rows and B columns of bit located in said initial pattern memory means, wherein said means for transforming said initial pattern into said intermediate pattern duplicates one or more of said columns, and wherein said enhanced pattern comprises two or more columns of bits, said means for storing said enhanced pattern comprising:

a means for storing certain ones of said columns of said enhanced pattern in said initial pattern memory and storing certain other ones of said columns of said enhanced pattern in a second memory means, said apparatus further comprising:

multiplexer means for multiplexing bits stored in said initial pattern memory means and said second memory means to recreate said enhanced pattern for printing.

18. The apparatus of claim 11 wherein said A by B matrix of bits is a pattern of 7 bits by 3 bits.

19. The apparatus of claim 11 wherein D>B.

* * * * *